Sept. 15, 1970  J. R. DEN BLEYKER  3,528,509
BULLDOZER BLADE WITH EXTENDIBLE CUTTING EDGE
Filed Sept. 11, 1968  4 Sheets-Sheet 1

INVENTOR
JOSEPH R. DEN BLEYKER
BY Kenneth C. Witt
ATTORNEY

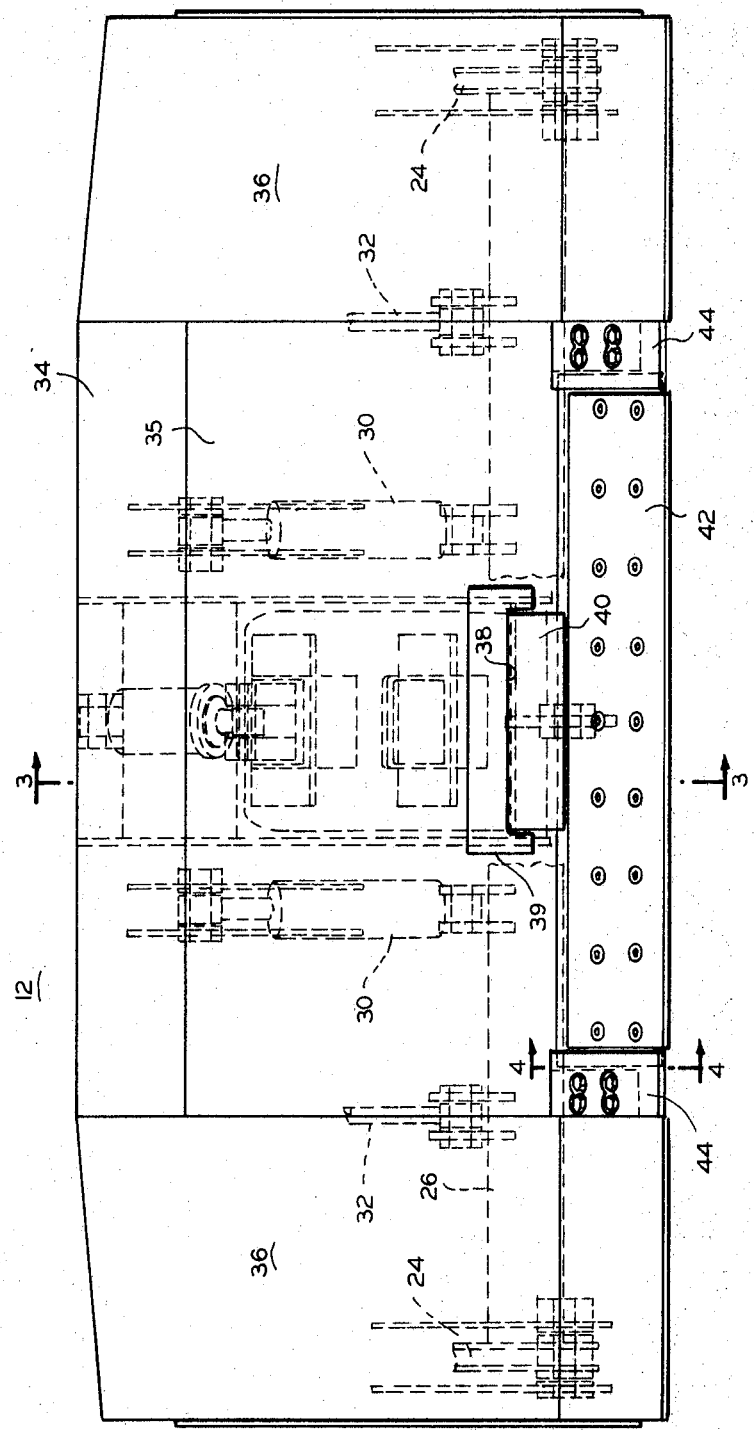

Sept. 15, 1970  J. R. DEN BLEYKER  3,528,509
BULLDOZER BLADE WITH EXTENDIBLE CUTTING EDGE
Filed Sept. 11, 1968  4 Sheets-Sheet 3

INVENTOR
JOSEPH R. DEN BLEYKER
BY
Kenneth C. Witt
ATTORNEY

Sept. 15, 1970  J. R. DEN BLEYKER  3,528,509
BULLDOZER BLADE WITH EXTENDIBLE CUTTING EDGE
Filed Sept. 11, 1968  4 Sheets-Sheet 1

INVENTOR
JOSEPH R. DEN BLEYKER
BY
Kenneth C. Witt
ATTORNEY

United States Patent Office 3,528,509
Patented Sept. 15, 1970

3,528,509
BULLDOZER BLADE WITH EXTENDIBLE CUTTING EDGE
Joseph R. Den Bleyker, Benton Harbor, Mich., assignor to Clark Equipment Company, a corporation of Delaware
Filed Sept. 11, 1968, Ser. No. 759,182
Int. Cl. E02f *3/76;* A01b *65/00*
U.S. Cl. 172—802                                    1 Claim

ABSTRACT OF THE DISCLOSURE

A bulldozer blade with an extendible and retractable cutting edge in which a slide extends through an opening in the moldboard. A movable blade portion is connected to the slide, and means are provided to move the slide in and out to either lower the movable blade portion below the remainder of the cutting edge of the bulldozer blade or raise it so that it corresponds with the remainder of the cutting edge.

BACKGROUND OF THE INVENTION

Other bulldozer blades are known in which a portion of the blade may be lowered in order to penetrate the earth while the remainder of the cutting edge of the blade is at or above ground level. U.S. Pat. 3,238,648, for example, shows such a bulldozer blade in which a structure at the center of the blade pivots downwardly and rearwardly.

The present bulldozer blade, however, provides a construction which includes a separate slidable blade portion which moves downward rectilinearly so that the angle of the movable blade portion with respect to the ground is not changed. In addition, the construction of the present invention requires minimum change in the normal blade structure and at the same time provides great ruggedness and reliability because the extendible and retractable blade portion is backed up at all times by the portion of the main moldboard upon which it slides.

SUMMARY OF THE INVENTION

In carrying out my invention in one preferred form thereof, I provide a bulldozer blade with an extendible and retractable cutting edge portion which comprises a transversely extending blade member connected to a slide member; the latter in turn extends through an opening in a moldboard. Guides are provided at each end of the movable blade member, and means are provided for sliding the blade member downwardly to extend it and upwardly again to retract it, depending upon operating conditions.

BRIEF DESCRIPTION OF DRAWING

In the drawing
FIG. 2 shows a front elevational view of the bulldozer blade.

DESCRIPTION OF THE PREFERRED EMBODIMENT

Figure 1:
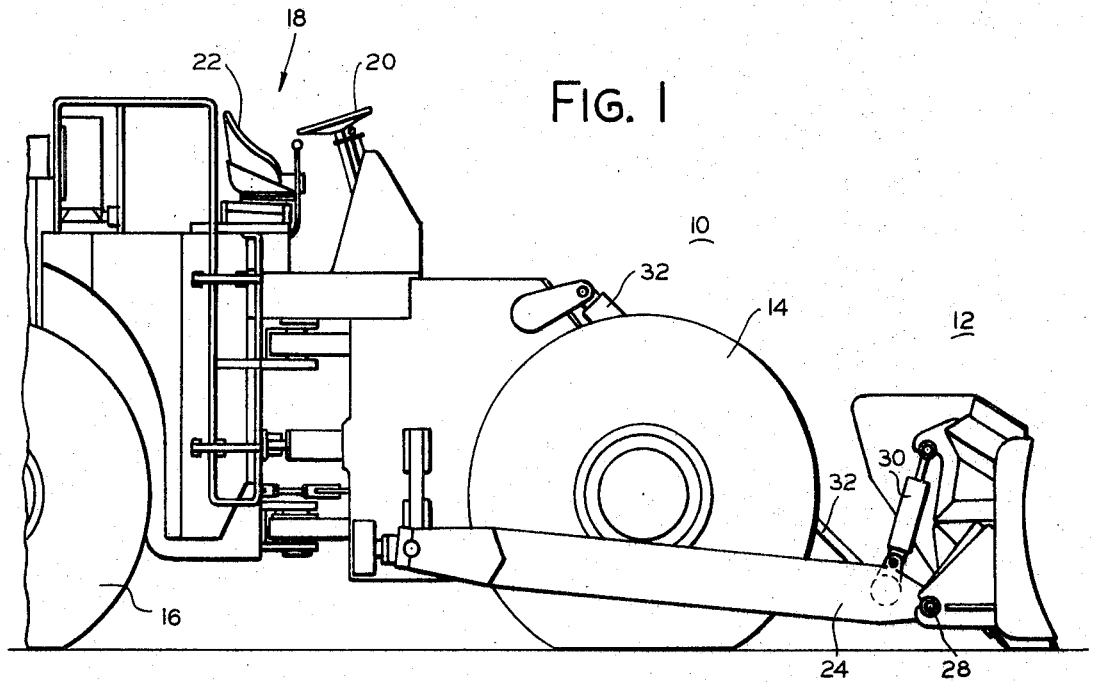
FIG. 1 shows a side elevational view of a portion of a vehicle on which a bulldozer blade of the present invention is mounted.

FIG. 1 shows a partial side elevational view of a vehicle indicated generally by the numeral 10 upon which the bulldozer blade of this invention indicated generally by the numeral 12 is mounted. Vehicle 10 may assume various forms but as illustrated it includes a pair of front wheels 14 (only one of which is visible in the drawing) and a pair of rear wheels 16 (one of which is partially visible), and all four wheels are driven by a suitable engine and drive train mechanism which are not visible in this drawing. The vehicle 10 has an operator's station 18 which includes a steering wheel 20, a seat 22 and the various levers and other devices necessary for the operation of the vehicle and the bulldozer blade thereon. As shown the vehicle 10 is of the articulated type but it will be readily understood by those skilled in the art that the bulldozer blade of this invention can be applied equally well to a solid frame vehicle.

The bulldozer blade 12 is supported on the vehicle by means of a pair of push arms or beams 24, one on each side of the vehicle, the push arms being interconnected by a cross-beam 26 which is indicated in dashed lines in FIG. 2. The bulldozer blade 12 is pivoted at 28 on each of the push arms to tilt forwardly and rearwardly, that is, to adjust the pitch, which adjustment is accomplished by means of a pair of piston-cylinder hydraulic actuators 30. The beam structure 24–26 may be raised and lowered—thereby raising and lowering the entire bulldozer blade 12 to adjust it to the proper level—by means of a pair of piston and cylinder actuators 32.

Figure 6:
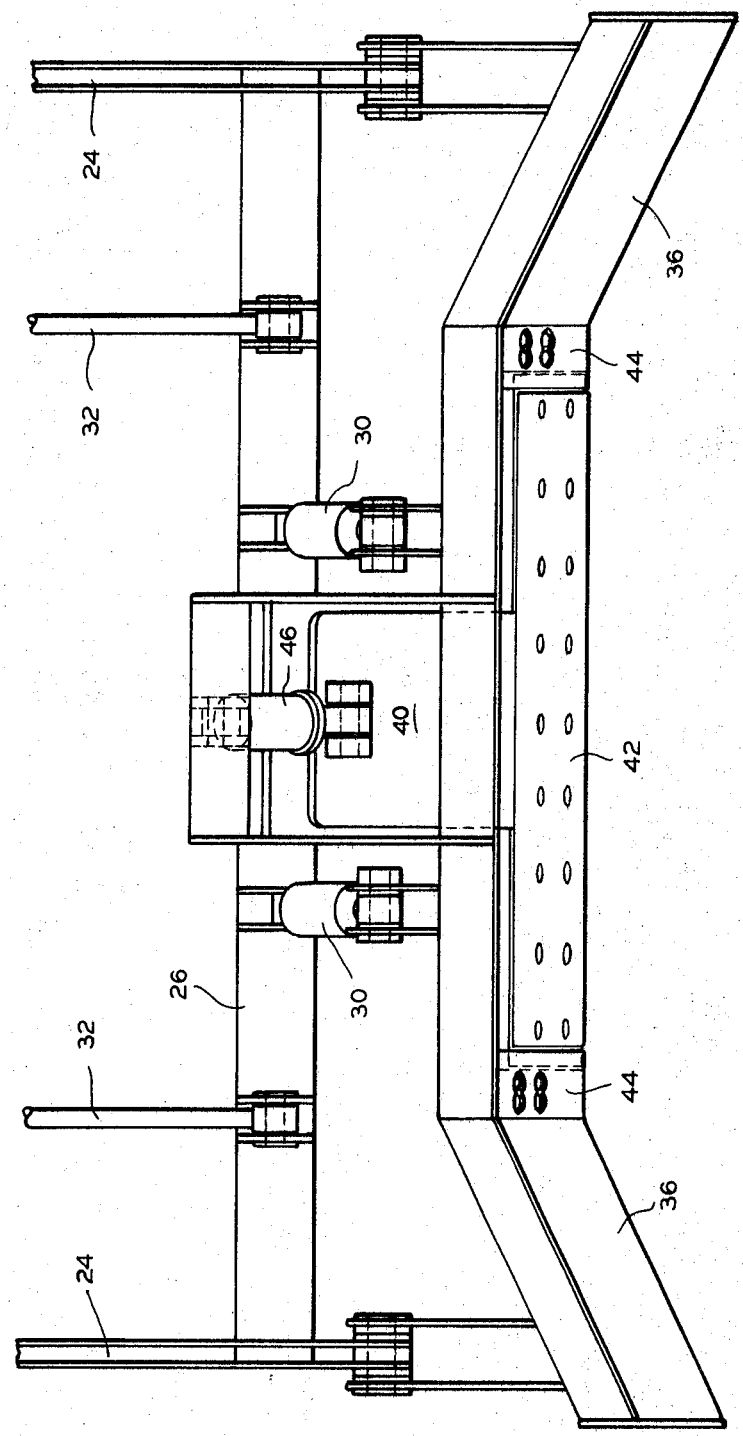
FIG. 6 shows a top plan view of the bulldozer blade.

As shown, the bulldozer blade includes a transversely disposed main curved moldboard portion 34 and a pair of forwardly extending wing portions 36 as may be seen best in FIG. 6 of the drawing. This U-shaped configuration makes it possible for the bulldozer blade to maintain more material in front of it as it is pushing dirt or other material along the ground because the forwardly extending wing portions on the ends tend to prevent the dirt or other material from sliding off the ends of the blade. However, it will be readily understood that the present invention is applicable also to a bulldozer blade which has a cutting edge which is straight across the bottom and is not limited to a blade of the U-type as illustrated.

Moldboard 34, in addition to the main curved member, may include an additional portion 35 secured to the front surface thereof to provide more strength and better wear characteristics, and also an additional bracket or brace member 39 secured to the front surface of member 35 and surrounding the opening 38, referred to hereinafter, to strengthen the edges of such opening. The moldboard may also include transversely disposed angle members 37 secured to the rear surface also to aid in providing strength and rigidity. At the bottom of the moldboard a transverse plate member 41 is secured to the bottom edge of the main moldboard member 34 in a suitable manner such as by welding. Plate member 41 provides a flat upper surface on which the slide 40 referred to hereinafter moves inwardly and outwardly.

Figure 3:
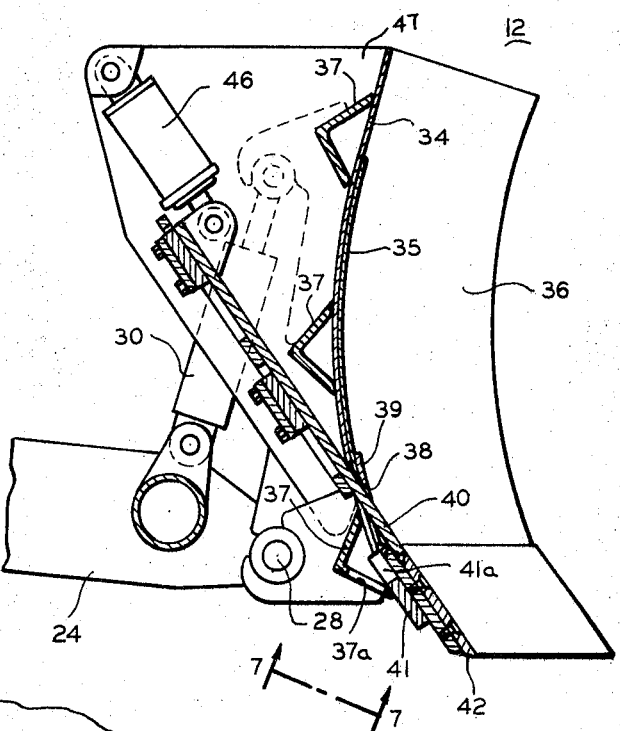
FIG. 3 shows a sectional view along the line 3—3 of FIG. 2.
Figure 5:
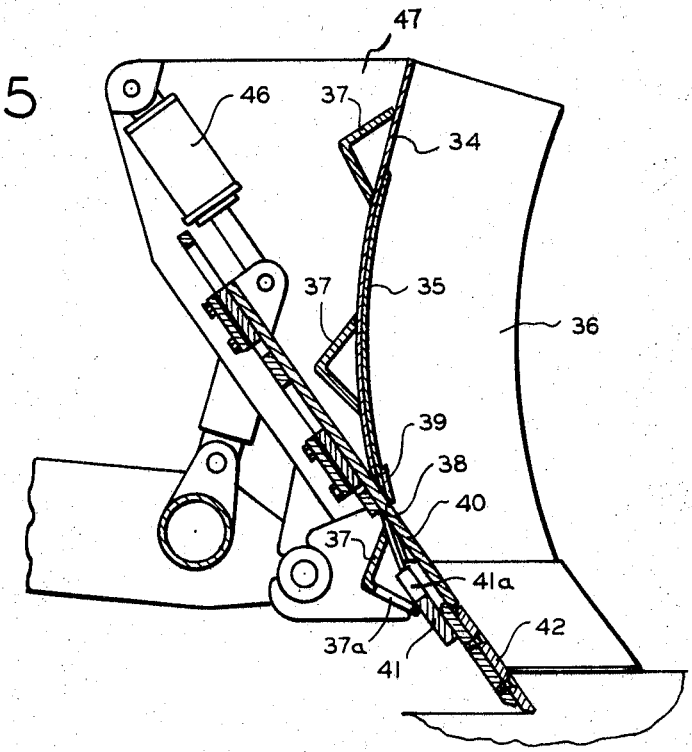
FIG. 5 shows a view similar to FIG. 3 except with the movable blade member in the partially extended position.
Figure 4:
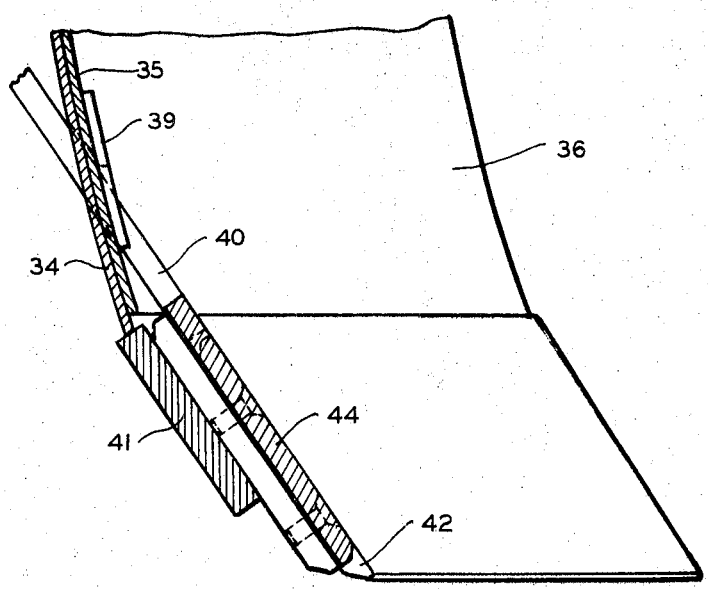
FIG. 4 shows a partial sectional view along the line 4—4 of FIG. 2.

Moldboard 34 includes a transversely extending opening 38 as may be seen in FIGS. 2, 3 and 5 and through this opening extends a slide 40. To the bottom of slide 40 is connected a transverse blade portion 42 which is arranged to slide in and out on flat portion 41 at the bottom of the moldboard 34, the ends of the blade 42 being retained by a pair of retainers 44 which are bolted to the moldboard. FIG. 4 shows the manner in which a portion of the retainer overlaps one end of a portion of the blade member to retain it in position during extension and retraction, and during operation in either position.

In this typical arrangement, blade member 42 is moved outwardly and inwardly by means of a piston and cylinder type hydraulic actuator 46, mounted on a support 47, which is connected to slide 40, the actuator 46 being remotely controlled from the operator's station 18. FIG. 3 shows the position when the blade 42 is retracted while FIG. 5 shows the movable blade portion 42 partially extended.

When it is desired to use only a portion of the total width of the bulldozer blade because of hard-packed soil or other difficult conditions, the blade portion 42 is extended so that it projects below the remainder of the moldboard structure and is used for digging operation. However, when the material to be moved is less difficult the blade portion 42 may be retracted and the entire width of the bulldozer blade, including the bottom cutting edges (or lower margins) of the wings, utilized to penetrate the earth or other material and push it forwardly to the desired location.

Figure 7:
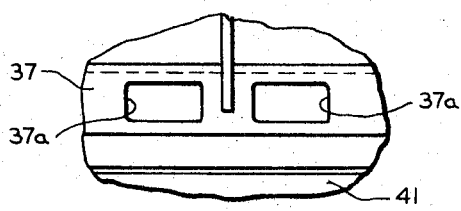
FIG. 7 is a fragmentary view along the line 7—7 of FIG. 3.

Under certain circumstances dirt or other foreign material may tend to collect between the movable blade portion 42 and portion 41 of the moldboard immediately beneath it, and any such accumulation of foreign material might interfere with the proper operation of movable blade portion 42. Such accumulation of material may be prevented by utilizing openings as illustrated in FIGS. 3, 5 and 7. As shown, there are a pair of openings 41a in flat portion 41, one on either side of the centerline of such member; these openings are in communication with blade portion 42. There is another pair of openings 37a in the lowermost angle member 37, and each of the openings 37a preferably is in alignment with one of the openings 41a so that any foreign material passing through the openings 41a falls out through the openings 37a back onto the ground.

While I have described and illustrated herein a preferred embodiment of my invention, it will be appreciated that modifications may be made. Accordingly, it should be understood that I intend to cover by the appended claim all modifications which fall within the true spirit and scope of my invention.

I claim:

1. A bulldozer blade with an extendible and retractable cutting edge portion comprising, a moldboard having an opening therethrough and a support on the rear thereof, a slide member slidably positioned in the said opening, a transversely disposed elongated blade portion connected to the bottom of the said slide member, guide means for the said blade portion mounted on the said moldboard at each end of the blade portion, means mounted on said support and connected to said blade providing reciprocal rectilinear movement of the said slide member to extend and retract the said blade portion, the said moldboard having a flat portion thereon slidably supporting the said blade portion, the said flat portion having at least one opening therethrough, such additional opening communicating with the said blade portion to permit the discharge of foreign material accumulating between the blade portion and said flat portion of the moldboard.

References Cited

UNITED STATES PATENTS

| 2,993,285 | 7/1961 | Hoxie | 172—777 |
| 3,039,209 | 6/1962 | Cron et al. | 37—98 |
| 3,238,648 | 3/1966 | Cobb et al. | 172—664 |

ROBERT E. BAGWILL, Primary Examiner

S. C. PELLEGRINO, Assistant Examiner

U.S. Cl. X.R.

172—664